US012783380B2

(12) United States Patent
Tawosi et al.

(10) Patent No.: US 12,783,380 B2
(45) Date of Patent: Nov. 3, 2026

(54) METHOD AND SYSTEM FOR PROVIDING MATERIALITY PREDICTION

(71) Applicant: JPMorgan Chase Bank, N.A., New York, NY (US)

(72) Inventors: Vali Tawosi, London (GB); Salwa Husam Alamir, Bournemouth (GB); Vamsi Vunnava, Buckinghamshire (GB); Ade Onigbanjo, London (GB); Sophia G Stock, London (GB); Sameena Shah, Scarsdale, NY (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 767 days.

(21) Appl. No.: 18/227,512

(22) Filed: Jul. 28, 2023

(65) Prior Publication Data

US 2025/0036540 A1 Jan. 30, 2025

(51) Int. Cl.
*G06F 11/34* (2006.01)
*G06F 11/30* (2006.01)

(52) U.S. Cl.
CPC ...... *G06F 11/3447* (2013.01); *G06F 11/3051* (2013.01)

(58) Field of Classification Search
None
See application file for complete search history.

(56) References Cited

U.S. PATENT DOCUMENTS

| | | | | |
|---|---|---|---|---|
| 8,214,308 B2 * | 7/2012 | Chu | G06N 5/02 706/14 |
| 10,970,634 B2 * | 4/2021 | Gustafson | G06N 5/02 |
| 10,984,367 B2 * | 4/2021 | Achin | G06Q 10/04 |
| 11,544,136 B1 * | 1/2023 | Pekel | G06F 11/079 |
| 12,488,301 B2 * | 12/2025 | Raman | G06Q 10/06393 |
| 12,541,707 B2 * | 2/2026 | Li | G06N 3/105 |
| 2017/0185921 A1 * | 6/2017 | Zhang | G06N 20/00 |
| 2021/0326782 A1 * | 10/2021 | Achin | G06Q 10/04 |

* cited by examiner

*Primary Examiner* — Maikhanh Nguyen
(74) *Attorney, Agent, or Firm* — GREENBLUM & BERNSTEIN, P.L.C.

(57) ABSTRACT

A method for providing action-based modeling to facilitate predictive analytics is disclosed. The method includes aggregating raw data from various sources, the raw data including application metadata; structuring the raw data to generate a primary data set; partitioning the primary data set to generate an action data set for predetermined actions, the action data set including a status label for each data point; generating a model for each of the predetermined actions; training the model based on the corresponding action data set; and determining an explanation for each of the predetermined actions based on the corresponding trained model, the explanation including a rule-based description in a natural language format.

17 Claims, 6 Drawing Sheets

400

400

500

600

METHOD AND SYSTEM FOR PROVIDING MATERIALITY PREDICTION

BACKGROUND

1. Field of the Disclosure

This technology generally relates to methods and systems for predictive analytics, and more particularly to methods and systems for facilitating predictive analytics by leveraging machine learning and artificial intelligence to provide action-based modeling of application metadata.

2. Background Information

Many business entities rely on large and complex networks of applications that operate on various computing environments such as, for example, cloud computing environments. Often, these applications must be migrated from one operating environment to another. Historically, implementations of conventional management techniques to facilitate the migrations have resulted in varying degrees of success with respect to effective and efficient resource administration.

One drawback of implementing the conventional management techniques is that in many instances, actions that are essential for satisfying requirements such as, for example, regulatory requirements to place the applications in condition for migration are reactively determined. As a result, the applications are not able to be effectively processed due to the back-and-forth cycle necessary to identify the actions. Additionally, ineffective actions may be initiated together with effective actions due to limited insight afforded by the reactive determination, which results in wasted time and resources.

Therefore, there is a need to facilitate predictive analytics that effectively identifies materiality of predetermined actions by leveraging machine learning and artificial intelligence to provide action-based modeling of application metadata.

SUMMARY

The present disclosure, through one or more of its various aspects, embodiments, and/or specific features or sub-components, provides, inter alia, various systems, servers, devices, methods, media, programs, and platforms for facilitating predictive analytics by leveraging machine learning and artificial intelligence to provide action-based modeling of application metadata.

According to an aspect of the present disclosure, a method for providing action-based modeling to facilitate predictive analytics is disclosed. The method is implemented by at least one processor. The method may include aggregating raw data from a plurality of sources, the raw data may include application metadata; structuring the raw data to generate at least one primary data set; partitioning the at least one primary data set to generate an action data set for each of at least one predetermined action, the action data set may include a status label for each of a plurality of data points; generating at least one model for each of the at least one predetermined action; training each of the at least one model based on the corresponding action data set; and determining an explanation for each of the at least one predetermined action based on the corresponding at least one trained model, the explanation may include a rule-based description in a natural language format.

In accordance with an exemplary embodiment, the method may further include receiving new application metadata that corresponds to a new application; generating at least one new primary data set based on the new application metadata; and determining, by using each of the at least one trained model, at least one predictive outcome for the new application based on the at least one new primary data set, each of the at least one predictive outcome may include a selection from among the at least one predetermined action.

In accordance with an exemplary embodiment, to determine the at least one predictive outcome, the method may further include identifying an activated model that is triggered based on the at least one new primary data set; and identifying the at least one predetermined action that corresponds to the activated model, wherein the activated model may be identified from among the at least one trained model; and wherein the at least one predictive outcome may include the identified at least one predetermined action that corresponds to the activated model.

In accordance with an exemplary embodiment, each of the at least one predictive outcome may include forecasted information that relates to an assessment time, an assessment questionnaire, an assessment clarity value, and an assessment necessity factor.

In accordance with an exemplary embodiment, the application metadata may include historical information for a plurality of applications, the historical information may include application-related metadata, user-related metadata, and probability-related metadata for the plurality of applications.

In accordance with an exemplary embodiment, each of the at least one predetermined action may correspond to a resolution action that satisfies a regulatory requirement, the resolution action may enable migration of an application from a first computing environment to a second computing environment.

In accordance with an exemplary embodiment, the explanation may include information that relates to at least one determinant model feature and a corresponding determinant value, the information may include a graphical representation that is displayable via a graphical user interface.

In accordance with an exemplary embodiment, to generate the at least one primary data set, the method may further include converting the raw data based on a predetermined data type to generate at least one structured data set; and numerically encoding at least one categorical feature in the at least one structured data set to generate the at least one primary data set.

In accordance with an exemplary embodiment, the at least one model may include at least one from among a deep learning model, a neural network model, a machine learning model, a mathematical model, a process model, and a data model.

According to an aspect of the present disclosure, a computing device configured to implement an execution of a method for providing action-based modeling to facilitate predictive analytics is disclosed. The computing device including a processor; a memory; and a communication interface coupled to each of the processor and the memory, wherein the processor may be configured to aggregate raw data from a plurality of sources, the raw data may include application metadata; structure the raw data to generate at least one primary data set; partition the at least one primary data set to generate an action data set for each of at least one predetermined action, the action data set may include a status label for each of a plurality of data points; generate at least one model for each of the at least one predetermined action; train each of the at least one model based on the corresponding action data set; and determine an explanation for each of the at least one predetermined action based on the corresponding at least one trained model, the explanation may include a rule-based description in a natural language format.

In accordance with an exemplary embodiment, the processor may be further configured to receive new application metadata that corresponds to a new application; generate at least one new primary data set based on the new application metadata; and determine, by using each of the at least one trained model, at least one predictive outcome for the new application based on the at least one new primary data set, each of the at least one predictive outcome may include a selection from among the at least one predetermined action.

In accordance with an exemplary embodiment, to determine the at least one predictive outcome, the processor may be further configured to identify an activated model that is triggered based on the at least one new primary data set; and identify the at least one predetermined action that corresponds to the activated model, wherein the activated model may be identified from among the at least one trained model; and wherein the at least one predictive outcome may include the identified at least one predetermined action that corresponds to the activated model.

In accordance with an exemplary embodiment, each of the at least one predictive outcome may include forecasted information that relates to an assessment time, an assessment questionnaire, an assessment clarity value, and an assessment necessity factor.

In accordance with an exemplary embodiment, the application metadata may include historical information for a plurality of applications, the historical information may include application-related metadata, user-related metadata, and probability-related metadata for the plurality of applications.

In accordance with an exemplary embodiment, each of the at least one predetermined action may correspond to a resolution action that satisfies a regulatory requirement, the resolution action may enable migration of an application from a first computing environment to a second computing environment.

In accordance with an exemplary embodiment, the explanation may include information that relates to at least one determinant model feature and a corresponding determinant value, the information may include a graphical representation that is displayable via a graphical user interface.

In accordance with an exemplary embodiment, to generate the at least one primary data set, the processor may be further configured to convert the raw data based on a predetermined data type to generate at least one structured data set; and numerically encode at least one categorical feature in the at least one structured data set to generate the at least one primary data set.

In accordance with an exemplary embodiment, the at least one model may include at least one from among a deep learning model, a neural network model, a machine learning model, a mathematical model, a process model, and a data model.

According to an aspect of the present disclosure, a non-transitory computer readable storage medium storing instructions for providing action-based modeling to facilitate predictive analytics is disclosed. The storage medium including executable code which, when executed by a processor, may cause the processor to aggregate raw data from a plurality of sources, the raw data may include application metadata; structure the raw data to generate at least one primary data set; partition the at least one primary data set to generate an action data set for each of at least one predetermined action, the action data set may include a status label for each of a plurality of data points; generate at least one model for each of the at least one predetermined action; train each of the at least one model based on the corresponding action data set; and determine an explanation for each of the at least one predetermined action based on the corresponding at least one trained model, the explanation may include a rule-based description in a natural language format.

In accordance with an exemplary embodiment, when executed by the processor, the executable code may further cause the processor to receive new application metadata that corresponds to a new application; generate at least one new primary data set based on the new application metadata; and determine, by using each of the at least one trained model, at least one predictive outcome for the new application based on the at least one new primary data set, each of the at least one predictive outcome may include a selection from among the at least one predetermined action.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Through one or more of its various aspects, embodiments and/or specific features or sub-components of the present disclosure are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 1:
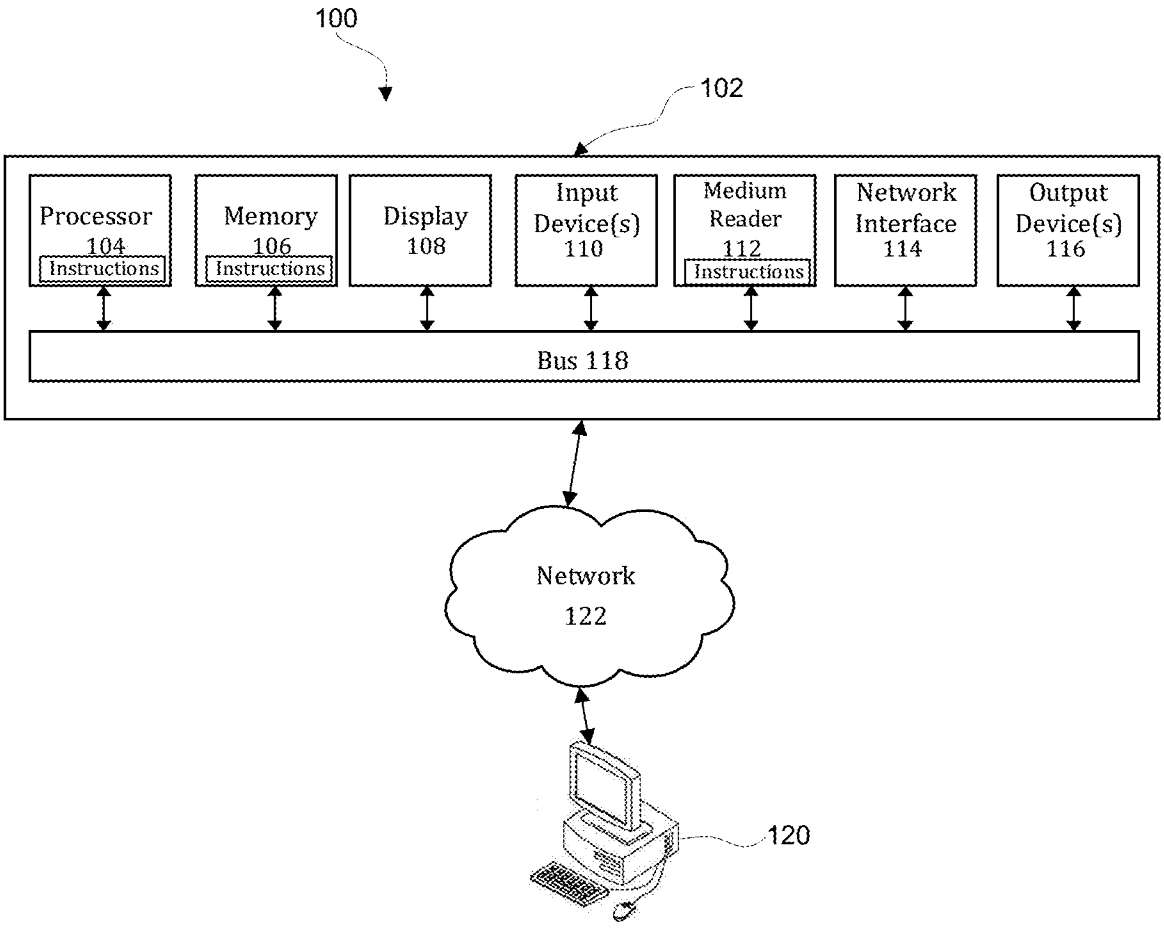
FIG. 1 illustrates an exemplary computer system.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a virtual desktop computer, a tablet computer, a set-top box, a personal digital assistant, a mobile device, a palmtop computer, a laptop computer, a desktop computer, a communications device, a wireless smart phone, a personal trusted device, a wearable device, a global positioning system (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disc read only memory (CD-ROM), digital versatile disc (DVD), floppy disk, blu-ray disc, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid-state display, a cathode ray tube (CRT), a plasma display, or any other type of display, examples of which are well known to persons skilled in the art.

The computer system 102 may also include at least one input device 110, such as a keyboard, a touch-sensitive input screen or pad, a speech input, a mouse, a remote-control device having a wireless keypad, a microphone coupled to a speech recognition engine, a camera such as a video camera or still camera, a cursor control device, a GPS device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software, or any combination thereof which are commonly known and understood as being included with or within a computer system, such as, but not limited to, a network interface 114 and an output device 116. The output device 116 may be, but is not limited to, a speaker, an audio out, a video out, a remote-control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

As described herein, various embodiments provide optimized methods and systems for facilitating predictive analytics by leveraging machine learning and artificial intelligence to provide action-based modeling of application metadata.

Figure 2:
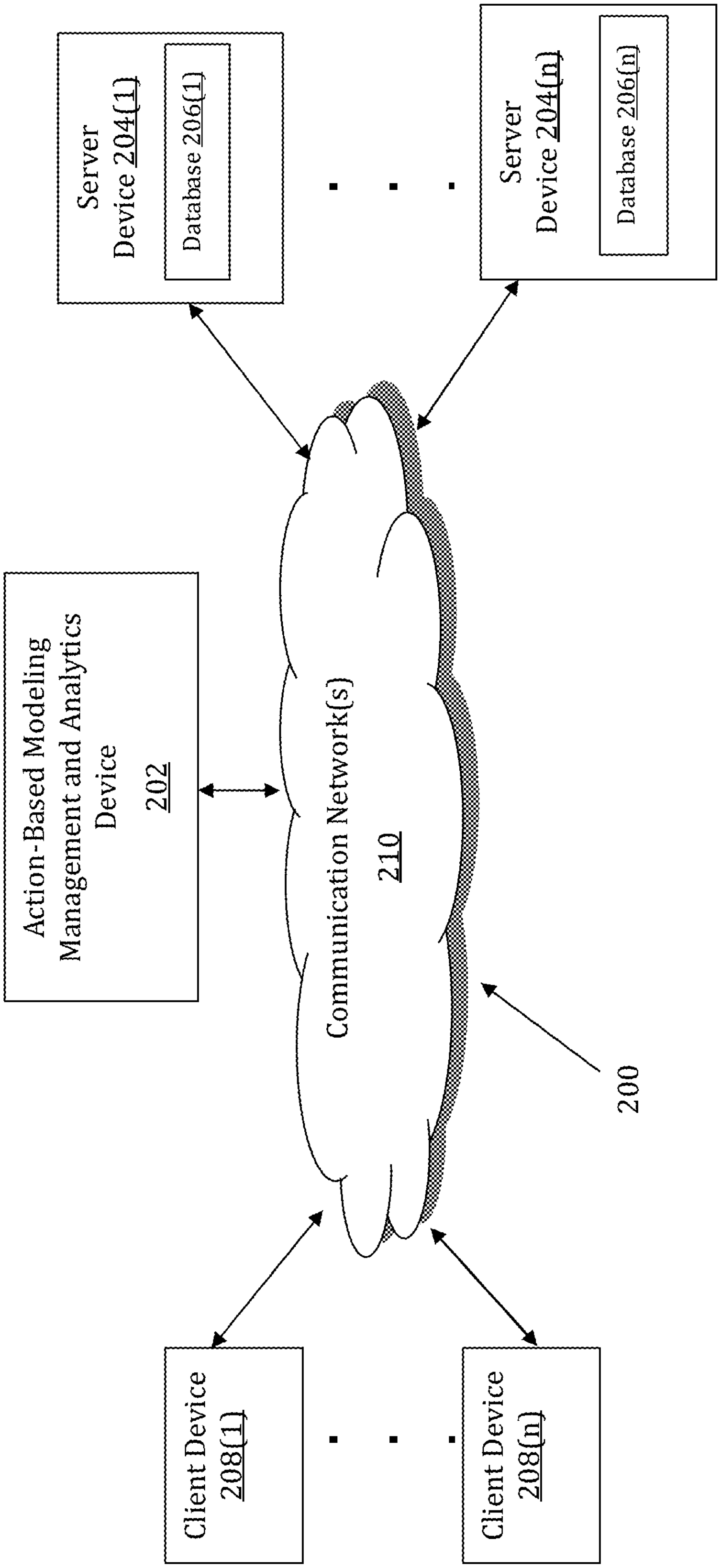
FIG. 2 illustrates an exemplary diagram of a network environment.

Referring to FIG. 2, a schematic of an exemplary network environment 200 for implementing a method for facilitating predictive analytics by leveraging machine learning and artificial intelligence to provide action-based modeling of application metadata is illustrated. In an exemplary embodiment, the method is executable on any networked computer platform, such as, for example, a personal computer (PC).

The method for facilitating predictive analytics by leveraging machine learning and artificial intelligence to provide action-based modeling of application metadata may be implemented by an Action-Based Modeling Management and Analytics (ABMMA) device 202. The ABMMA device 202 may be the same or similar to the computer system 102 as described with respect to FIG. 1. The ABMMA device 202 may store one or more applications that can include executable instructions that, when executed by the ABMMA device 202, cause the ABMMA device 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the ABMMA device 202 itself, may be located in virtual server(s) running in a cloud-based computing environment rather than being tied to one or more specific physical network computing devices. Also, the application(s) may be running in one or more virtual machines (VMs) executing on the ABMMA device 202. Additionally, in one or more embodiments of this technology, virtual machine(s) running on the ABMMA device 202 may be managed or supervised by a hypervisor.

In the network environment 200 of FIG. 2, the ABMMA device 202 is coupled to a plurality of server devices 204(1)-204(*n*) that hosts a plurality of databases 206(1)-206(*n*), and also to a plurality of client devices 208(1)-208(*n*) via communication network(s) 210. A communication interface of the ABMMA device 202, such as the network interface 114 of the computer system 102 of FIG. 1, operatively couples and communicates between the ABMMA device 202, the server devices 204(1)-204(*n*), and/or the client devices 208(1)-208(*n*), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the ABMMA device 202, the server devices 204(1)-204(*n*), and/or the client devices 208(1)-208(*n*) may be coupled together via other topologies. Additionally, the network environment 200 may include other network devices such as one or more routers and/or switches, for example, which are well known in the art and thus will not be described herein. This technology provides a number of advantages including methods, non-transitory computer readable media, and ABMMA devices that efficiently implement a method for facilitating predictive analytics by leveraging machine learning and artificial intelligence to provide action-based modeling of application metadata.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The ABMMA device 202 may be a standalone device or integrated with one or more other devices or apparatuses, such as one or more of the server devices 204(1)-204(*n*), for example. In one particular example, the ABMMA device 202 may include or be hosted by one of the server devices 204(1)-204(*n*), and other arrangements are also possible. Moreover, one or more of the devices of the ABMMA device 202 may be in a same or a different communication network including one or more public, private, or cloud networks, for example.

The plurality of server devices 204(1)-204(*n*) may be the same or similar to the computer system 102 or the computer device 120 as described with respect to FIG. 1, including any features or combination of features described with respect thereto. For example, any of the server devices 204(1)-204(*n*) may include, among other features, one or more processors, a memory, and a communication interface, which are coupled together by a bus or other communication link, although other numbers and/or types of network devices may be used. The server devices 204(1)-204(*n*) in this example may process requests received from the ABMMA device 202 via the communication network(s) 210 according to the HTTP-based and/or JavaScript Object Notation (JSON) protocol, for example, although other protocols may also be used.

The server devices 204(1)-204(*n*) may be hardware or software or may represent a system with multiple servers in a pool, which may include internal or external networks. The server devices 204(1)-204(*n*) hosts the databases 206(1)-206(*n*) that are configured to store data that relates to raw data, structured data, application metadata, primary data sets, action data sets, status labels, data points, machine learning models, explanations, rule-based descriptions, and predictive outcomes.

Although the server devices 204(1)-204(*n*) are illustrated as single devices, one or more actions of each of the server devices 204(1)-204(*n*) may be distributed across one or more distinct network computing devices that together comprise one or more of the server devices 204(1)-204(*n*). Moreover, the server devices 204(1)-204(*n*) are not limited to a particular configuration. Thus, the server devices 204(1)-204(*n*) may contain a plurality of network computing devices that operate using a controller/agent approach, whereby one of the network computing devices of the server devices 204(1)-204(*n*) operates to manage and/or otherwise coordinate operations of the other network computing devices.

The server devices 204(1)-204(*n*) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(*n*) may also be the same or similar to the computer system 102 or the computer device 120 as described with respect to FIG. 1, including any features or combination of features described with respect thereto. For example, the client devices 208(1)-208(*n*) in this example may include any type of computing device that can interact with the ABMMA device 202 via communication network(s) 210. Accordingly, the client devices 208(1)-208(*n*) may be mobile computing devices, desktop computing devices, laptop computing devices, tablet computing devices, virtual machines (including cloud-based computers), or the like, that host chat, e-mail, or voice-to-text applications, for example. In an exemplary embodiment, at least one client device 208 is a wireless mobile communication device, i.e., a smart phone.

The client devices 208(1)-208(*n*) may run interface applications, such as standard web browsers or standalone client applications, which may provide an interface to communicate with the ABMMA device 202 via the communication network(s) 210 in order to communicate user requests and information. The client devices 208(1)-208(*n*) may further include, among other features, a display device, such as a display screen or touchscreen, and/or an input device, such as a keyboard, for example.

Although the exemplary network environment 200 with the ABMMA device 202, the server devices 204(1)-204(*n*), the client devices 208(1)-208(*n*), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the ABMMA device 202, the server devices 204(1)-204(*n*), or the client devices 208(1)-208(*n*), for example, may be configured to operate as virtual instances on the same physical machine. In other words, one or more of the ABMMA device 202, the server devices 204(1)-204(*n*), or the client devices 208(1)-208(*n*) may operate on the same physical device rather than as separate devices communicating through communication network(s) 210. Additionally, there may be more or fewer ABMMA devices 202, server devices 204(1)-204(*n*), or client devices 208(1)-208(*n*) than illustrated in FIG. 2.

In addition, two or more computing systems or devices may be substituted for any one of the systems or devices in any example. Accordingly, principles and advantages of distributed processing, such as redundancy and replication, also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
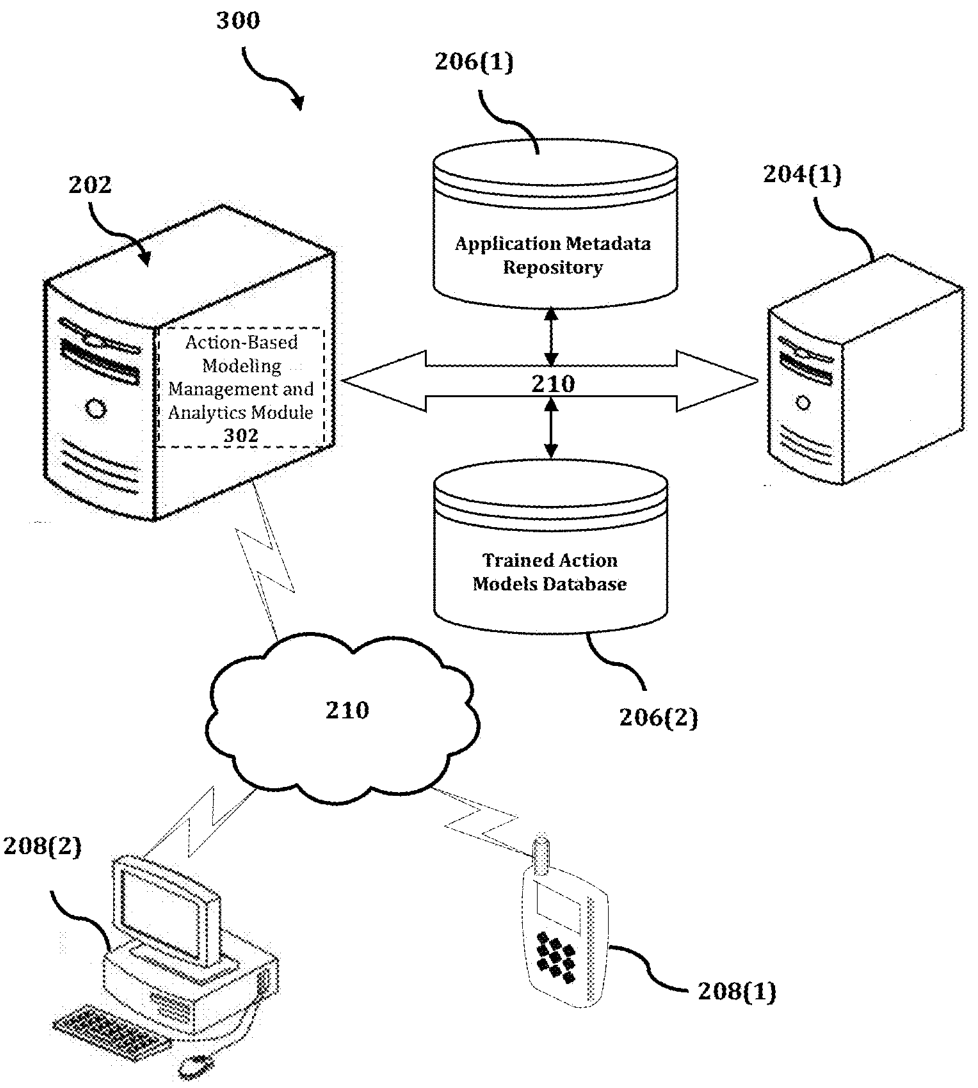
FIG. 3 shows an exemplary system for implementing a method for facilitating predictive analytics by leveraging machine learning and artificial intelligence to provide action-based modeling of application metadata.

The ABMMA device 202 is described and shown in FIG. 3 as including an action-based modeling management and analytics module 302, although it may include other rules, policies, modules, databases, or applications, for example.

As will be described below, the action-based modeling management and analytics module 302 is configured to implement a method for facilitating predictive analytics by leveraging machine learning and artificial intelligence to provide action-based modeling of application metadata.

An exemplary process 300 for implementing a mechanism for facilitating predictive analytics by leveraging machine learning and artificial intelligence to provide action-based modeling of application metadata by utilizing the network environment of FIG. 2 is shown as being executed in FIG. 3. Specifically, a first client device 208(1) and a second client device 208(2) are illustrated as being in communication with ABMMA device 202. In this regard, the first client device 208(1) and the second client device 208(2) may be "clients" of the ABMMA device 202 and are described herein as such. Nevertheless, it is to be known and understood that the first client device 208(1) and/or the second client device 208(2) need not necessarily be "clients" of the ABMMA device 202, or any entity described in association therewith herein. Any additional or alternative relationship may exist between either or both of the first client device 208(1) and the second client device 208(2) and the ABMMA device 202, or no relationship may exist.

Further, ABMMA device 202 is illustrated as being able to access an application metadata repository 206(1) and a trained action models database 206(2). The action-based modeling management and analytics module 302 may be configured to access these databases for implementing a method for facilitating predictive analytics by leveraging machine learning and artificial intelligence to provide action-based modeling of application metadata.

The first client device 208(1) may be, for example, a smart phone. Of course, the first client device 208(1) may be any additional device described herein. The second client device 208(2) may be, for example, a PC. Of course, the second client device 208(2) may also be any additional device described herein.

The process may be executed via the communication network(s) 210, which may comprise plural networks as described above. For example, in an exemplary embodiment, either or both of the first client device 208(1) and the second client device 208(2) may communicate with the ABMMA device 202 via broadband or cellular communication. Of course, these embodiments are merely exemplary and are not limiting or exhaustive.

Upon being started, the action-based modeling management and analytics module 302 executes a process for facilitating predictive analytics by leveraging machine learning and artificial intelligence to provide action-based modeling of application metadata. An exemplary process for facilitating predictive analytics by leveraging machine learning and artificial intelligence to provide action-based modeling of application metadata is generally indicated at flowchart 400 in FIG. 4.

Figure 4:
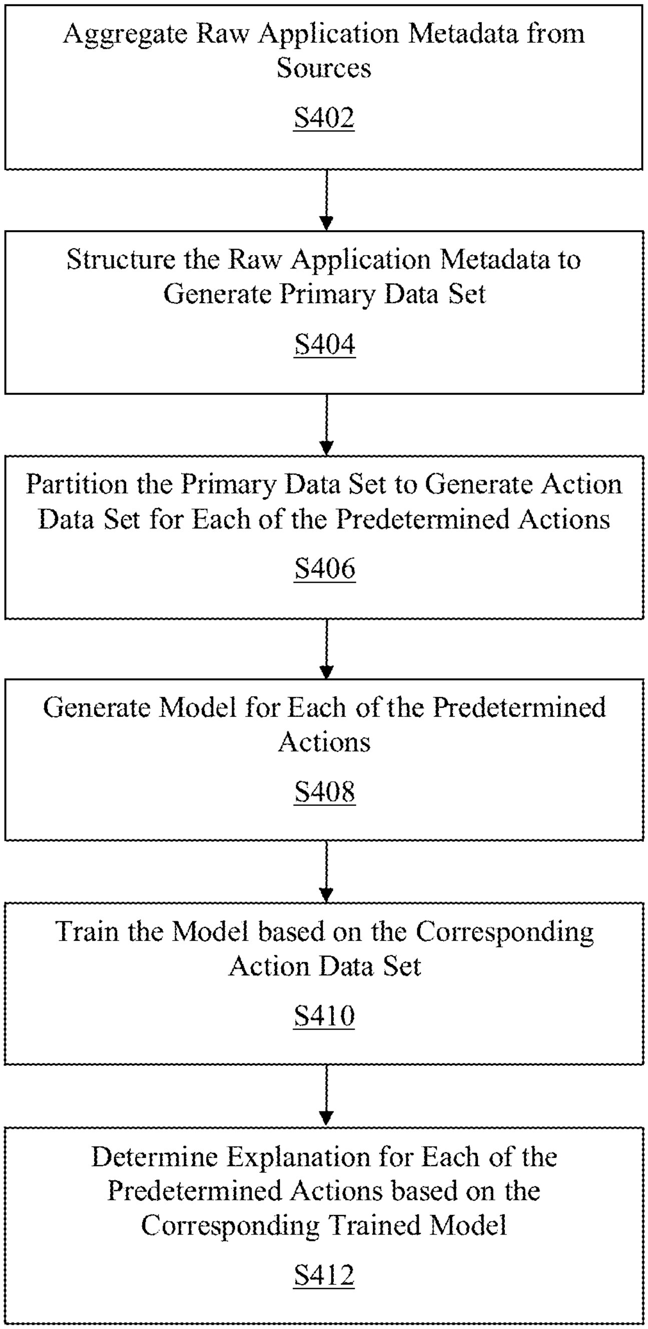
FIG. 4 is a flowchart of an exemplary process for implementing a method for facilitating predictive analytics by leveraging machine learning and artificial intelligence to provide action-based modeling of application metadata.

In the process 400 of FIG. 4, at step S402, raw data may be aggregated from a plurality of sources. In an exemplary embodiment, the raw data may relate to unstructured data that has not been processed for consumption by the disclosed invention. The raw data may include values in a variety of data formats. The values may include characters such as, for example, numeric characters, alphabetic characters, and symbolic characters. In another exemplary embodiment, the raw data may be aggregated from a plurality of sources such as, for example, first-party data sources as well as third party data sources. The raw data may be automatically aggregated via an application programming interface as well as manually inputted by a user via a graphical user interface.

In another exemplary embodiment, the raw data may include application metadata. The application metadata may relate to any information that describes applications and/or defines parameters of the applications. The application metadata may include historical information for the applications. The historical information may include application-related metadata, user-related metadata, and probability-related metadata for each of the applications. For example, the probability-related metadata may include information that indicates a risk that the application is flagged during an assessment process. The information may include a risk level such as, for example, a high risk level, a medium risk level, and a low risk level.

In another exemplary embodiment, the applications may include at least one from among a monolithic application and a microservice application. The monolithic application may describe a single-tiered software application where the user interface and data access code are combined into a single program from a single platform. The monolithic application may be self-contained and independent from other computing applications.

In another exemplary embodiment, a microservice application may include a unique service and a unique process that communicates with other services and processes over a network to fulfill a goal. The microservice application may be independently deployable and organized around business capabilities. In another exemplary embodiment, the microservices may relate to a software development architecture such as, for example, an event-driven architecture made up of event producers and event consumers in a loosely coupled choreography. The event producer may detect or sense an event such as, for example, a significant occurrence or change in state for system hardware or software and represent the event as a message. The event message may then be transmitted to the event consumer via event channels for processing.

In another exemplary embodiment, the event-driven architecture may include a distributed data streaming platform for the publishing, subscribing, storing, and processing of event streams in real time. As will be appreciated by a person of ordinary skill in the art, each microservice in a microservice choreography may perform corresponding actions independently and may not require any external instructions.

In another exemplary embodiment, microservices may relate to a software development architecture such as, for example, a service-oriented architecture which arranges a complex application as a collection of coupled modular services. The modular services may include small, independently versioned, and scalable customer-focused services with specific business goals. The services may communicate with other services over standard protocols with well-defined interfaces. In another exemplary embodiment, the microservices may utilize technology-agnostic communication protocols such as, for example, a Hypertext Transfer Protocol (HTTP) to communicate over a network and may be implemented by using different programming languages, databases, hardware environments, and software environments.

At step S404, the raw data may be structured to generate a primary data set. In an exemplary embodiment, the primary data set may relate to a structured data set. The primary data set may include a collection of processed data that have been merged into the structured data set. For example, separately aggregated data may be structured and merged into the primary data set to create a singular collection of working data.

In another exemplary embodiment, to facilitate the generating of the primary data set, the raw data may be converted based on a predetermined data type to generate structured data sets. The raw data may be processed for type conversions from one data type to another data type to ensure compatibility. Then, categorical features in the structured data sets may be numerically encoded to facilitate generation of the primary data set. Categorical values of the categorical features may be converted into numerical values to enable consumption by machine learning models. The numerical values allow for fitting of the categorical features into the machine learning models.

At step S406, the primary data set may be partitioned to generate an action data set for each of a plurality of predetermined actions. In an exemplary embodiment, the primary data set may be divided into the action data sets, i.e., individual data sets, for each of the predetermined actions. After merging all the available data into the primary data set, the action data sets may be created for each of the predetermined actions. In another exemplary embodiment, the action data sets that are specific to the predetermined actions may include all data for applications that have previously gone through an assessment process such as, for example, a regulatory assessment process. The data may include application data as well as corresponding assessment data such as, for example, questions that were raised during the assessment process.

In another exemplary embodiment, each of the predetermined actions may correspond to a resolution action that satisfies a regulatory requirement. The resolution action may enable migration of applications from a first computing environment to a second computing environment. For example, the predetermined actions may be necessary to enable migration of an application from an on-premises computing environment to a cloud computing environment. In another exemplary embodiment, the predetermined actions may include workflow tasks that are necessary for an application owner to complete to facilitate the assessment process. For example, the predetermined actions may include a security validation task for the application owner to complete to allow for regulatory approval.

In another exemplary embodiment, the action data set may include a status label for each of a plurality of data points. The data points in the action data set may be labelled to indicate whether or not a corresponding application was assigned with a specific predetermined action. For example, the status label may include a true value when the application that corresponds to the data points is assigned with the specific predetermined action during the assessment process. Alternatively, the status label may include a false value when the application that corresponds to the data points is not assigned with the specific predetermined action.

At step S408, a model may be generated for each of the predetermined actions. The model may be usable to make predictions for the corresponding predetermined actions based on automatically identified data patterns. In an exemplary embodiment, the model may include at least one from among a deep learning model, a neural network model, a machine learning model, a mathematical model, a process model, and a data model. The language model may also include stochastic models such as, for example, a Markov model that is used to model randomly changing systems. In stochastic models, the future states of a system may be assumed to depend only on the current state of the system.

In another exemplary embodiment, machine learning and pattern recognition may include supervised learning algorithms such as, for example, k-medoids analysis, regression analysis, decision tree analysis, random forest analysis, k-nearest neighbors analysis, logistic regression analysis, etc. In another exemplary embodiment, machine learning analytical techniques may include unsupervised learning algorithms such as, for example, Apriori algorithm analysis, K-means clustering analysis, etc. In another exemplary embodiment, machine learning analytical techniques may include reinforcement learning algorithms such as, for example, Markov Decision Process analysis, etc.

In another exemplary embodiment, the model may be based on a machine learning algorithm. The machine learning algorithm may include at least one from among a process and a set of rules to be followed by a computer in calculations and other problem-solving operations such as, for example, a linear regression algorithm, a logistic regression algorithm, a decision tree algorithm, and/or a Naive Bayes algorithm.

In another exemplary embodiment, the machine learning process may include a neural network that relates to at least one from among an artificial neural network and a simulated neural network. The neural network may correspond to a technique in artificial intelligence that teaches computers to process data by using interconnected processing nodes and/or artificial neurons. The neural network may relate to a type of machine learning such as, for example, deep learning that uses interconnected nodes and/or artificial neurons in a layered structure to transform inputs for predictive analytics.

In another exemplary embodiment, the model may include training models such as, for example, a machine learning model which is generated to be further trained on additional data. Once the training model has been sufficiently trained, the training model may be deployed onto various connected systems to be utilized. In another exemplary embodiment, the training model may be sufficiently trained when model assessment methods such as, for example, a holdout method, a K-fold-cross-validation method, and a bootstrap method determine that at least one of the training model's least squares error rate, true positive rate, true negative rate, false positive rate, and false negative rates are within predetermined ranges.

In another exemplary embodiment, the training model may be operable, i.e., actively utilized by an organization, while continuing to be trained using new data. In another exemplary embodiment, the models may be generated using at least one from among an artificial neural network technique, a decision tree technique, a support vector machines technique, a Bayesian network technique, and a genetic algorithms technique.

At step S410, each of the models may be trained based on the corresponding action data set. To facilitate the training, the models may consume the corresponding action data set to learn and/or identify patterns. In an exemplary embodiment, the models may be trained by using supervised learning techniques or unsupervised learning techniques consistent with present disclosures. A machine learning algorithm may build a model by examining many examples and attempt to find a model that minimizes loss; this process may be called empirical risk minimization. The main difference between supervised and unsupervised learning may be the need for labelled training data. Supervised machine learning may rely on labelled input and output training data, whereas unsupervised learning may process unlabeled data.

At step S412, an explanation may be determined for each of the predetermined actions based on the corresponding trained model. In an exemplary embodiment, the explanation may relate to information that provides a reason for a particular model feature and/or provides justification for a predictive outcome of the trained model. The information may include a description of decisions that are made by the trained model. For example, in the case of a decision tree-based machine learning model, the explanation may be generated by interpreting decisions made by the model and tracing the decisions back to effective features and corresponding determinant values.

In another exemplary embodiment, the explanation may include information that relates to determinant model features and corresponding determinant values for each of the trained models. The explanation may include a graphical representation of the information that is displayable via a graphical user interface. For example, by using the trained models, an explanation may be generated for each of the predetermined actions in the form of a decision tree.

In another exemplary embodiment, the explanation may include a rule-based description in a natural language format. The rule-based description may be generated by using the information in the explanation such as, for example, by using the decision tree. The rule-based description may be generated to provide context for decisions made by the trained model in a data format that is easily understandable by a user. For example, the rule-based description may describe in a natural language format that features appearing closer to the root of the decision tree are the features that have more determination power on the output of the model, thus are more important in decision making.

In another exemplary embodiment, predictive outcomes related to the predetermined actions may be determined for a new application by using the trained models. That is, metadata for the new applications may be preprocessed and encoded consistent with present disclosures for use with the trained models to predict a likelihood that a certain predetermined action would be triggered. To facilitate the predictive outcome determination, new application metadata that corresponds to the new application may be received. The new application metadata may be received automatically from an application management component such as, for example, an application development platform via an application programming interface. Alternatively, the new application metadata may be received from a user such as, for example, regulatory personnel as an input via a graphical user interface.

Then, a new primary data set may be generated based on the new application metadata. The new primary data set may be generated for the new application by preprocessing and encoding the new application metadata consistent with present disclosures. Once generated, the new primary data set may be divided into individual data sets for each of the trained models. Predictive outcomes may be determined for the new application by using the trained models and the individual data sets. The predictive outcomes may include a selection of a predetermined action from among the plurality of predetermined actions.

In another exemplary embodiment, each of the predictive outcomes may include forecasted information that relates to an assessment time, an assessment questionnaire, an assessment clarity value, and an assessment necessity factor. The assessment time may relate to a predicted time value that is expected for application assessment. For example, the forecasted assessment time may indicate that a regulatory approval process for a particular application is expected to take a couple of months. Action items for a particular assessment may be planned accordingly based on the forecasted assessment time.

Similarly, the assessment questionnaire may relate to predicted inquires for the assessment process. For example, the assessment questionnaire may include questions that are expected to be raised by regulators during the regulatory approval process to clarify information before a review request is submitted. By predicting assessment questionnaires, responses may be prepared in advance to expedite the assessment process. The assessment clarity value may relate to predicted level of clarity for information that is submitted for the assessment process. For example, the assessment clarity value may indicate that a certain data set that will be submitted for the assessment has a low clarity level. By predicting assessment clarity values, data sets may be revised to improve clarity prior to assessment submission.

Furthermore, the assessment necessity factor may relate to predicted information that is not expected to be necessary for the assessment process. For example, action items that are not expected to be necessary for the assessment process may be automatically removed from an assessment workflow and/or placed lower on a listing of priority actions. The trained models may identify the action items as not expected to be necessary based on predictive machine learning mechanisms such as, for example, counterfactual explanations.

In another exemplary embodiment, to determine the predictive outcomes, an activated model may be identified from among the trained models. The activated model may correspond to a trained model that has been triggered based on the new primary data set. For example, the individual data sets that correspond to the new primary data set may be inputted into each of the trained models to see which of the trained models may be activated.

Then, a predetermined action that corresponds to the activated model may be identified. By activating, the trained model indicates that the corresponding predetermined action is likely to occur. For example, when the trained model for predetermined action A is activated based on the new application metadata, the trained model indicates that predetermined action A is likely to be triggered by regulators for the new application. That is, the predictive outcomes may include the identified predetermined action that corresponds to the activated model.

Figure 5:
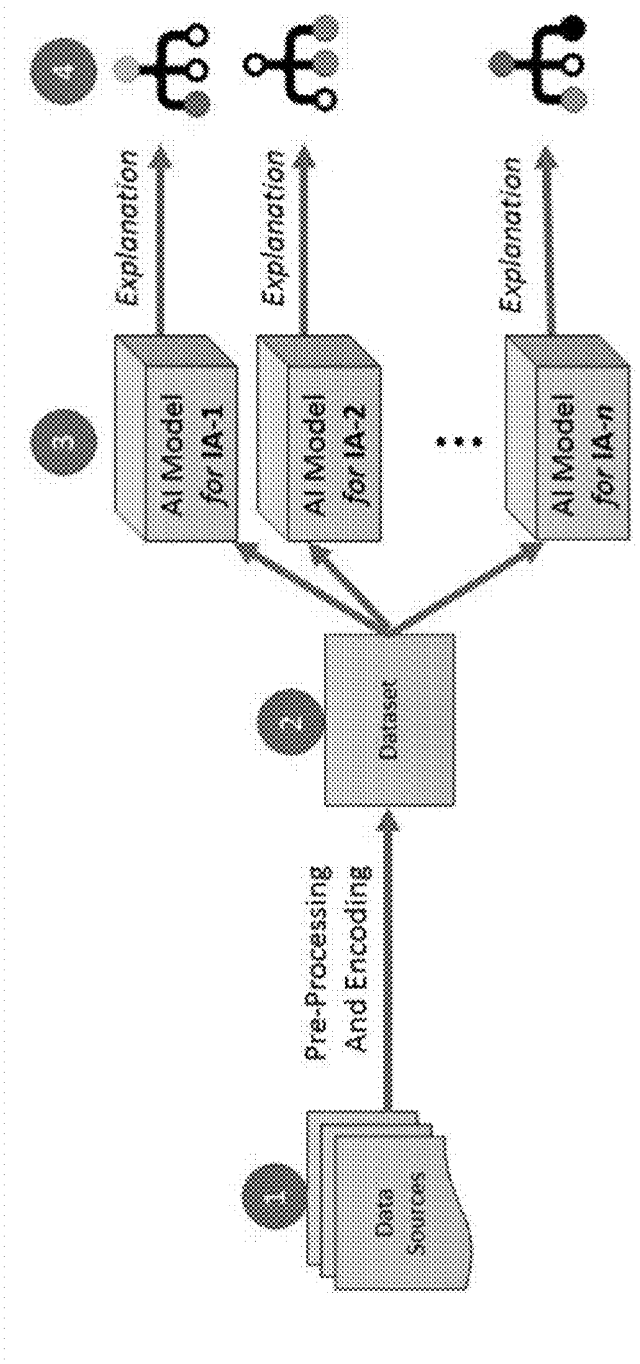
FIG. 5 is an architecture diagram of an exemplary process for implementing a method for facilitating predictive analytics by leveraging machine learning and artificial intelligence to provide action-based modeling of application metadata.

FIG. 5 is an architecture diagram 500 of an exemplary process for implementing a method for facilitating predictive analytics by leveraging machine learning and artificial intelligence to provide action-based modeling of application metadata. In FIG. 5, action-specific models may be trained to facilitate predictive determination for corresponding predetermined actions.

As illustrated in FIG. 5, in step 1, application-related, user-related, and risk-related metadata may be aggregated for a plurality of applications. In step 2, the raw input data may be processed for type conversions and for numerical encoding of categorical features. After merging all available data into a primary dataset, individual data sets may be created for each of the predetermined actions. The action-specific data sets may hold all data for applications that have previously gone through an assessment process. All data points in the action-specific data set may be labelled with either True or False, based on whether the corresponding application was assigned with the specific predetermined action.

Then, in step 3, action-specific machine learning models may be trained by using the action-specific data sets to make predictions for the predetermined actions. The predictions may relate to whether the specific predetermined action may be triggered by regulators in an assessment process. Finally, in step 5, explanations for each of the models may be generated for an end user consistent with present disclosures.

Figure 6:
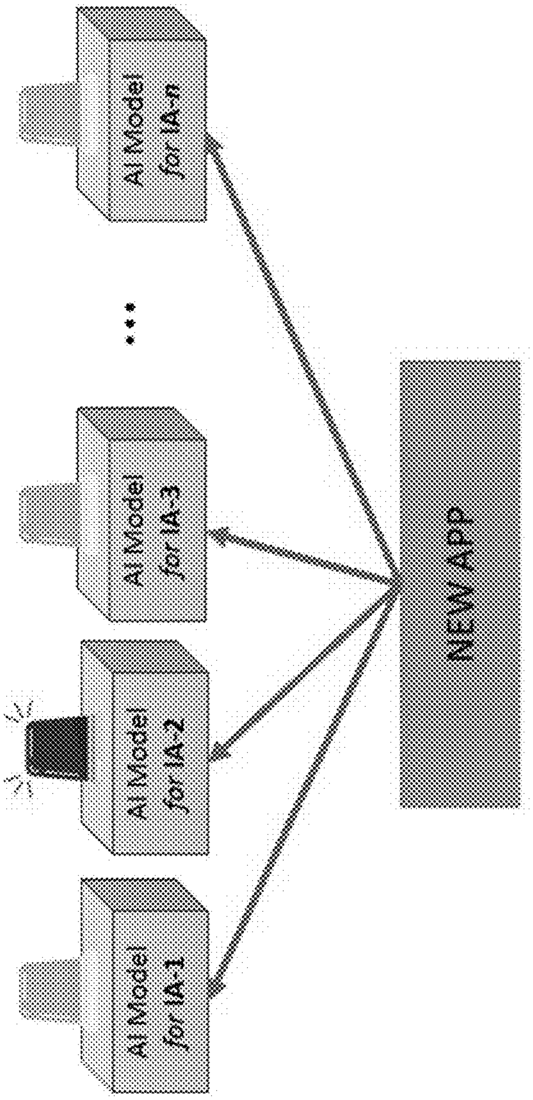
FIG. 6 is a flow diagram of an exemplary predictive process for implementing a method for facilitating predictive analytics by leveraging machine learning and artificial intelligence to provide action-based modeling of application metadata.

FIG. 6 is a flow diagram 600 of an exemplary predictive process for implementing a method for facilitating predictive analytics by leveraging machine learning and artificial intelligence to provide action-based modeling of application metadata. In FIG. 6, the trained machine learning models may be usable to determine whether a new application is likely to trigger certain actions during the assessment process.

As illustrated in FIG. 6, metadata of new applications may be preprocessed and encoded consistent with present disclosures for consumption by the trained models. The preprocessed metadata may be usable by the models to predict whether a particular predetermined action is likely to be triggered by regulators during the assessment process. For example, predictive output of the models may indicate that predetermined action 2 is likely to be triggered by regulators when the model associated with predetermined action 2 is activated by the preprocessed metadata.

The action-specific models may be easily re-trained in a feed-back loop whenever new application data becomes available. As such, when new applications are passed through the assessment process, the new application data may be used as training data. Consistent with present disclosures, the predictive performance of the models may improve with additional training data.

Accordingly, with this technology, an optimized process for facilitating predictive analytics by leveraging machine learning and artificial intelligence to provide action-based modeling of application metadata is disclosed.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for providing action-based modeling to facilitate predictive analytics, the method being implemented by at least one processor, the method comprising:

aggregating, by the at least one processor, raw data from a plurality of sources, the raw data including application metadata;

structuring, by the at least one processor, the raw data to generate at least one primary data set;

partitioning, by the at least one processor, the at least one primary data set to generate an action data set for each of at least one predetermined action, the action data set including a status label for each of a plurality of data points;

generating, by the at least one processor, at least one model for each of the at least one predetermined action;

training, by the at least one processor, each of the at least one model based on the corresponding action data set;

determining, by the at least one processor, an explanation for each of the at least one predetermined action based on the corresponding at least one trained model, the explanation including a rule-based description in a natural language format;

receiving, by the at least one processor, new application metadata that corresponds to a new application;

generating, by the at least one processor, at least one new primary data set based on the new application metadata; and determining, by the at least one processor using each of the at least one trained model, at least one predictive outcome for the new application based on the at least one new primary data set, each of the at least one predictive outcome including a selection from among the at least one predetermined action.

2. The method of claim 1, wherein the determining of the at least one predictive outcome further comprises:

identifying, by the at least one processor, an activated model that is triggered based on the at least one new primary data set; and identifying, by the at least one processor, the at least one predetermined action that corresponds to the activated model, wherein the activated model is identified from among the at least one trained model; and wherein the at least one predictive outcome includes the identified at least one predetermined action that corresponds to the activated model.

3. The method of claim 1, wherein each of the at least one predictive outcome includes forecasted information that relates to an assessment time, an assessment questionnaire, an assessment clarity value, and an assessment necessity factor.

4. The method of claim 1, wherein the application metadata includes historical information for a plurality of applications, the historical information including application-related metadata, user-related metadata, and probability-related metadata for the plurality of applications.

5. The method of claim 1, wherein each of the at least one predetermined action corresponds to a resolution action that satisfies a regulatory requirement, the resolution action enabling migration of an application from a first computing environment to a second computing environment.

6. The method of claim 1, wherein the explanation includes information that relates to at least one determinant model feature and a corresponding determinant value, the information including a graphical representation that is displayable via a graphical user interface.

7. The method of claim 1, wherein the generating of the at least one primary data set further comprises:

converting, by the at least one processor, the raw data based on a predetermined data type to generate at least one structured data set; and numerically encoding, by the at least one processor, at least one categorical feature in the at least one structured data set to generate the at least one primary data set.

8. The method of claim 1, wherein the at least one model includes at least one from among a deep learning model, a neural network model, a machine learning model, a mathematical model, a process model, and a data model.

9. A computing device configured to implement an execution of a method for providing action-based modeling to facilitate predictive analytics, the computing device comprising:

a processor;

a memory; and a communication interface coupled to each of the processor and the memory, wherein the processor is configured to:

aggregate raw data from a plurality of sources, the raw data including application metadata;

structure the raw data to generate at least one primary data set;

partition the at least one primary data set to generate an action data set for each of at least one predetermined action, the action data set including a status label for each of a plurality of data points;

generate at least one model for each of the at least one predetermined action;

train each of the at least one model based on the corresponding action data set; and determine an explanation for each of the at least one predetermined action based on the corresponding at least one trained model, the explanation including a rule-based description in a natural language format;

receive new application metadata that corresponds to a new application;

generate at least one new primary data set based on the new application metadata; and determine, by using each of the at least one trained model, at least one predictive outcome for the new application based on the at least one new primary data set, each of the at least one predictive outcome including a selection from among the at least one predetermined action.

10. The computing device of claim 9, wherein, to determine the at least one predictive outcome, the processor is further configured to:

identify an activated model that is triggered based on the at least one new primary data set; and identify the at least one predetermined action that corresponds to the activated model, wherein the activated model is identified from among the at least one trained model; and wherein the at least one predictive outcome includes the identified at least one predetermined action that corresponds to the activated model.

11. The computing device of claim 9, wherein each of the at least one predictive outcome includes forecasted information that relates to an assessment time, an assessment questionnaire, an assessment clarity value, and an assessment necessity factor.

12. The computing device of claim 9, wherein the application metadata includes historical information for a plurality of applications, the historical information including application-related metadata, user-related metadata, and probability-related metadata for the plurality of applications.

13. The computing device of claim 9, wherein each of the at least one predetermined action corresponds to a resolution action that satisfies a regulatory requirement, the resolution action enabling migration of an application from a first computing environment to a second computing environment.

14. The computing device of claim 9, wherein the explanation includes information that relates to at least one determinant model feature and a corresponding determinant value, the information including a graphical representation that is displayable via a graphical user interface.

15. The computing device of claim 9, wherein, to generate the at least one primary data set, the processor is further configured to:

convert the raw data based on a predetermined data type to generate at least one structured data set; and numerically encode at least one categorical feature in the at least one structured data set to generate the at least one primary data set.

16. The computing device of claim 9, wherein the at least one model includes at least one from among a deep learning model, a neural network model, a machine learning model, a mathematical model, a process model, and a data model.

17. A non-transitory computer readable storage medium storing instructions for providing action-based modeling to facilitate predictive analytics, the storage medium comprising executable code which, when executed by a processor, causes the processor to:

aggregate raw data from a plurality of sources, the raw data including application metadata;

structure the raw data to generate at least one primary data set;

partition the at least one primary data set to generate an action data set for each of at least one predetermined action, the action data set including a status label for each of a plurality of data points;

generate at least one model for each of the at least one predetermined action;

train each of the at least one model based on the corresponding action data set;

determine an explanation for each of the at least one predetermined action based on the corresponding at least one trained model, the explanation including a rule-based description in a natural language format;

receive new application metadata that corresponds to a new application;

generate at least one new primary data set based on the new application metadata; and determine, by using each of the at least one trained model, at least one predictive outcome for the new application based on the at least one new primary data set, each of the at least one predictive outcome including a selection from among the at least one predetermined action.

* * * * *